(12) United States Patent
Xiao et al.

(10) Patent No.: US 9,838,102 B2
(45) Date of Patent: *Dec. 5, 2017

(54) SYSTEM AND METHOD FOR WIRELESS COMMUNICATIONS MEASUREMENTS AND CSI FEEDBACK

(71) Applicant: Futurewei Technologies, Inc., Plano, TX (US)

(72) Inventors: Weimin Xiao, Hoffman Estates, IL (US); Jialing Liu, Palatine, IL (US); Bingyu Qu, Rolling Meadows, IL (US)

(73) Assignee: Futurewei Technologies, Inc., Plano, TX (US)

( * ) Notice: Subject to any disclaimer, the term of this patent is extended or adjusted under 35 U.S.C. 154(b) by 45 days.

This patent is subject to a terminal disclaimer.

(21) Appl. No.: 14/632,881

(22) Filed: Feb. 26, 2015

(65) Prior Publication Data

US 2015/0171948 A1 Jun. 18, 2015

Related U.S. Application Data

(63) Continuation of application No. 13/732,129, filed on Dec. 31, 2012, now Pat. No. 9,008,585.
(Continued)

(51) Int. Cl.
*H04B 17/00* (2015.01)
*H04B 7/06* (2006.01)
(Continued)

(52) U.S. Cl.
CPC ........... *H04B 7/0626* (2013.01); *H04B 17/24* (2015.01); *H04B 17/309* (2015.01);
(Continued)

(58) Field of Classification Search
CPC ..... H04W 24/00; H04W 28/00; H04W 24/10; H04W 72/082; H04W 72/085
(Continued)

(56) References Cited

U.S. PATENT DOCUMENTS

2012/0213261 A1 8/2012 Sayana et al.
2013/0010750 A1 1/2013 Hoshino et al.
(Continued)

FOREIGN PATENT DOCUMENTS

CN 102149124 A 8/2011
CN 102684835 A 9/2012
(Continued)

OTHER PUBLICATIONS

Samsung, "Interference Measurement for Downlink CoMP," R1-114228, 3GPP TSG RAN WG1, Meeting #67; San Francisco, CA, USA, Nov. 14-18, 2011, 4 pages.
(Continued)

*Primary Examiner* — Jean Gelin
(74) *Attorney, Agent, or Firm* — Slater Matsil, LLP (57) ABSTRACT

Measurements and Channel State Information (CSI) feedback are configured using communications between a network and user equipment (UE). The communications includes a first signaling from a network component to the UE indicating one or more reference signal (RS) resource configurations, a second signaling indicating one or more interference measurement (IM) resource configurations, and a third signaling indicating a CSI report configuration, wherein the CSI report configuration indicates a subset of the one or more RS resource configurations and a subset of the one or more IM resource configurations. The UE establishes a RS based measurement according to the subset of the one or more RS resource configurations and an IM according to the subset of the one or more IM resource configurations. The UE then generates and sends to the network a CSI report in accordance with the CSI report configuration and using the RS based measurement and the IM.

21 Claims, 7 Drawing Sheets

Related U.S. Application Data (60) Provisional application No. 61/592,417, filed on Jan. 30, 2012.

(51) Int. Cl.

| | | |
|---|---|---|
| *H04W 72/08* | (2009.01) | |
| *H04L 1/00* | (2006.01) | |
| *H04L 1/06* | (2006.01) | |
| *H04B 17/24* | (2015.01) | |
| *H04B 17/309* | (2015.01) | |
| *H04W 24/08* | (2009.01) | |
| *H04W 28/06* | (2009.01) | |
| *H04W 72/04* | (2009.01) | |
| *H04L 5/00* | (2006.01) | |
| *H04W 88/02* | (2009.01) | |

(52) U.S. Cl.
CPC .......... *H04L 1/0026* (2013.01); *H04L 1/0027* (2013.01); *H04L 1/0077* (2013.01); *H04L 1/06* (2013.01); *H04L 5/0035* (2013.01); *H04L 5/0048* (2013.01); *H04L 5/0053* (2013.01); *H04L 5/0094* (2013.01); *H04W 24/08* (2013.01); *H04W 72/082* (2013.01); *H04L 5/005* (2013.01); *H04L 5/0023* (2013.01); *H04W 28/06* (2013.01); *H04W 72/042* (2013.01); *H04W 88/02* (2013.01)

(58) Field of Classification Search
USPC ......... 455/403, 414.1, 424, 425, 451, 452.2, 455/454, 458, 67.11, 67.13, 63.1
See application file for complete search history.

(56) References Cited

U.S. PATENT DOCUMENTS

| | | |
|---|---|---|
| 2013/0033998 A1 | 2/2013 | Seo et al. |
| 2013/0156008 A1 | 6/2013 | Dinan |
| 2013/0208604 A1 | 8/2013 | Lee et al. |

FOREIGN PATENT DOCUMENTS

| | | |
|---|---|---|
| WO | 2012099319 A1 | 7/2012 |
| WO | 2012115811 A1 | 8/2012 |
| WO | 2012177092 A2 | 12/2012 |

OTHER PUBLICATIONS

Catt, "Considerations on Reference Signal for Interference Measurement," R1-113733, 3GPP TSG RAN WG1, Meeting #67, San Francisco, CA, USA, Nov. 14-18, 2011, 6 pages.

Huawei, Hisilicon, "Resources for Interference Measurements," R1-120032, 3GPP TSG RAN WG1, Meeting #68, Dresden, Germany, Feb. 6-10, 2012, 10 pages.

"CSI Feedback Operation for CoMP," Ericsson 3GPP Draft R1-120784, 3GPP TSG-RAN WG1 #68, Feb. 6-10, 2012, Dresden, Germany, 3 pages.

"ETSI Technical Specification LTE; Evolved Universal Terrestrial Radio Access(E-UTRA); Physical layer procedures (3GPP TS 36.213 version 11.0.0 Release 11)" ETSI TS 136 213 v11.0.0 (Oct. 2012), 145 pages.

"3rd Generation Partnership Project; Technical Specification Group Radio Access Network; Evolved Universal Terrestrial Radio Access (E-UTRA); Physical layer procedures (Release 10)," 3GPP TR 36.213 v10.4.0 (Dec. 2011), 70 pages.

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 v10.4.0 (Dec. 2011), 24 pages.

"3rd Generation Partnership Project; Technical Specification Group Radio Access Network; Evolved Universal Terrestrial Radio Access (E-UTRA); Physical layer procedures; (Release 10)," 3GPP TS 36.213 v10.4.0 (Dec. 2011), 125 pages.

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 v10.4.0 (Dec. 2011), 296 pages.

"3rd Generation Partnership Project; Technical Specification Group Radio Access Network; Coordinated multi-point operation for LTE physical layer aspects (Release 11)" 3GPP TR 36.819 v11.1.0 (Dec. 2011), 69 pages.

International Search Report and Written Opinion received in International Application No. PCT/CN2013/071105 mailed May 16, 2013, 12 pages.

Extended European Search Report Received in European Application No. 13743897.4, Mailed Nov. 28, 2014, 8 pages.

"Utilization of resource-restricted measurements for CoMP feedback," Huawei, HiSilicon 3GPP Draft R1-120030, 3GPP TSG-RAN WG1 #68, Feb. 6-10, 2012, Dresden, Germany, 3 pages.

SYSTEM AND METHOD FOR WIRELESS COMMUNICATIONS MEASUREMENTS AND CSI FEEDBACK

This application is a continuation of U.S. Non-Provisional application Ser. No. 13/732,129 filed on Dec. 31, 2012 entitled "System and Method for Wireless Communications Measurements and CSI Feedback," which claims the benefit of U.S. Provisional Application No. 61/592,417 filed on Jan. 30, 2012, both of which are hereby incorporated herein by reference as if reproduced in their entireties.

TECHNICAL FIELD

The present invention relates to the field of wireless communications, and, in particular embodiments, to a system and method for configuring wireless communications measurements and CSI feedback.

BACKGROUND

Present and future wireless communication systems include LTE, LTE-A and LTE-A-beyond systems. Measurements and Channel State Information (CSI) feedback are one focus area in LTE-A studies. Measurements and CSI feedback are typically based on various reference signals (RSs). In downlink transmission of LTE-A system, there are reference signals for UE to perform channel/signal estimation/measurements for demodulation of Physical downlink control channel (PDCCH) and other common channels, as well as for some measurements and feedbacks. The reference signals include the Common/Cell-specific Reference Signal (CRS) inherited from the Rel-8/9 specification of E-UTRA. A dedicated/de-modulation reference signal (DMRS) can be transmitted together with the Physical downlink shared channel (PDSCH) in Rel-10 of E-UTRA. The DMRS is used for channel estimation during PDSCH demodulation.

In Rel-10, Channel Status Indication Reference Signal (CSI-RS) is introduced in addition to CRS and DMRS. CSI-RS is used for Rel-10 UEs to measure the channel status, e.g., for multiple antennas cases. PMI/CQI/RI and other feedbacks may be based on the measurement of CSI-RS for Rel-10 and beyond UE. The PMI is the precoding Matrix indicator, and the CQI is channel quantity indicator, and the RI is rank indicator of the precoding matrix. The CSI-RS in Rel-10 can support up to 8 transmission antennas while the CRS can only support up to 4 transmission antennas in Rel-8/9. The number of CSI-RS antenna ports can be 1, 2, 4, or 8. In addition, to support the same number of antenna ports, the CSI-RS has less overhead due to its low density in time and frequency.

SUMMARY

In accordance with an embodiment, a method implemented by a user equipment (UE) comprises receiving from a network a first signaling indicating one or more reference signal (RS) resource configurations, receiving from the network a second signaling indicating one or more interference measurement (IM) resource configurations, and receiving from the network a third signaling indicating a channel state information (CSI) report configuration, wherein the CSI report configuration indicates a subset of the one or more RS resource configurations and a subset of the one or more IM resource configurations.

In another embodiment, a UE configured for wireless communications measurements and CSI feedback comprises a processor and a computer readable storage medium storing programming for execution by the processor. The programming including instructions to receive from a network a first signaling indicating one or more RS resource configurations, receive from the network a second signaling indicating one or more IM resource configurations, and receive from the network a third signaling indicating a CSI report configuration, wherein the CSI report configuration indicates a subset of the one or more RS resource configurations and a subset of the one or more IM resource configurations.

In another embodiment, a method implemented by a network component for configuring a UE for wireless communications measurements and CSI feedback comprises transmitting to the UE a first signaling indicating one or more RS resource configurations, transmitting to the UE a second signaling indicating one or more IM resource configurations, and transmitting to the UE a third signaling indicating a CSI report configuration, wherein the CSI report configuration indicates a subset of the one or more RS resource configurations and a subset of the one or more IM resource configurations.

In another embodiment, a network component for configuring a UE for wireless communications measurements and CSI feedback comprises a processor and a computer readable storage medium storing programming for execution by the processor. The programming including instructions to transmit to the UE a first signaling indicating one or more RS resource configurations, transmit to the UE a second signaling indicating one or more IM resource configurations, and transmit to the UE a third signaling indicating a CSI report configuration, wherein the CSI report configuration indicates a subset of the one or more RS resource configurations and a subset of the one or more IM resource configurations.

In yet another embodiment, a method implemented by a network component for configuring a UE for wireless communications measurements and CSI feedback comprises receiving from a second network component information about a first IM resource configuration and a second IM resource configuration, wherein the first IM resource configuration is associated with a first transmission activity by the second network component and the second IM resource configuration is associated with a second transmission activity by the second network component. The method further comprises transmitting to the UE a first signaling indicating one or more RS resource configurations, transmitting to the UE a second signaling indicating one or more IM resource configurations, wherein the one or more IM resource configurations include the first IM resource configuration and the second IM resource configuration; and transmitting to the UE a third signaling indicating one or more CSI report configurations, wherein the one or more CSI report configurations indicate a subset of the one or more RS resource configurations and a subset of the one or more IM resource configurations.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In Orthogonal frequency-division multiplexing (OFDM) systems, the frequency bandwidth is divided into multiple subcarriers in frequency domain. In time domain, one subframe is divided into multiple OFDM symbols. The OFDM symbol may have cyclic prefix to avoid the inter-symbol interference due to multiple path delays. One resource element is defined by the time-frequency resource within one subcarrier and one OFDM symbol. A reference signal and other signals, such as data channel PDSCH and control channel PDCCH, are orthogonal and multiplexed in different resource elements in time-frequency domain. Further, the signals are modulated and mapped into resource elements. Using inverse Fourier transform per each OFDM symbol, the signals in frequency domain are transformed into the signals in time domain, and are transmitted with added cyclic prefix to avoid the inter-symbol interference.

Figure 1:
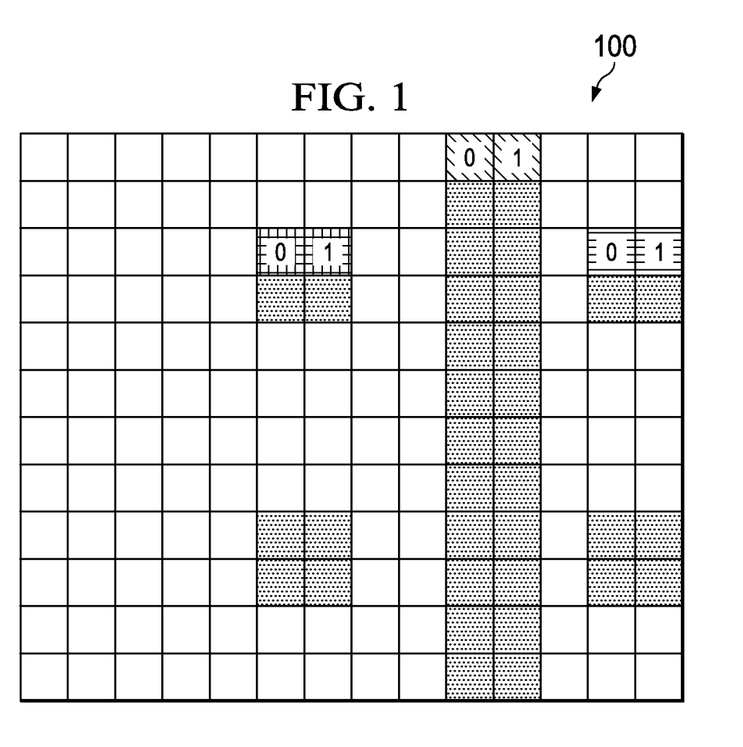
FIG. 1 illustrates example CSI-RS patterns for two antenna ports.
Figure 2:
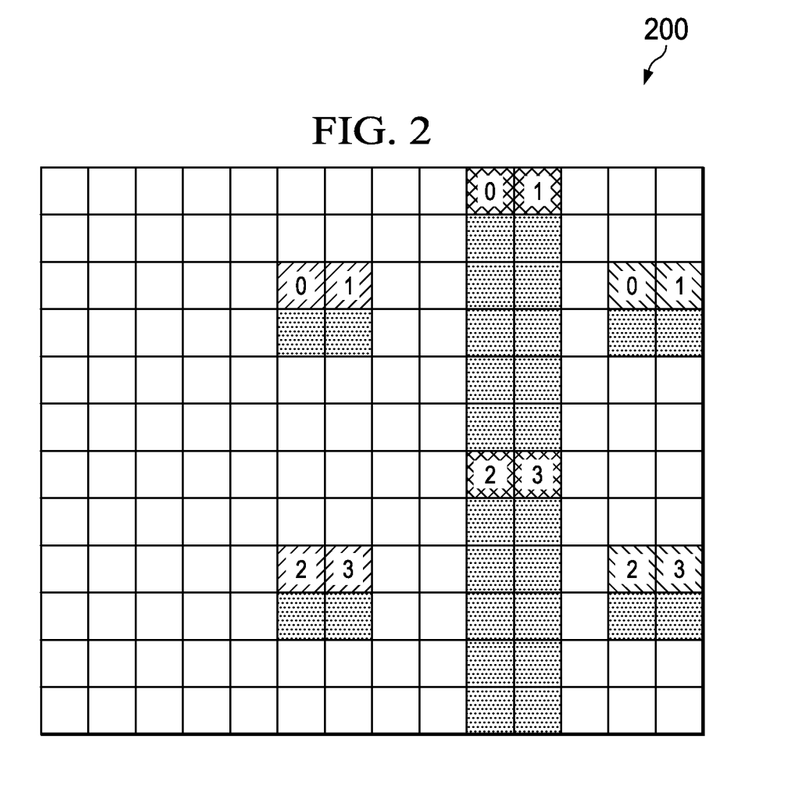
FIG. 2 illustrates example CSI-RS patterns for four antenna ports.
Figure 3:
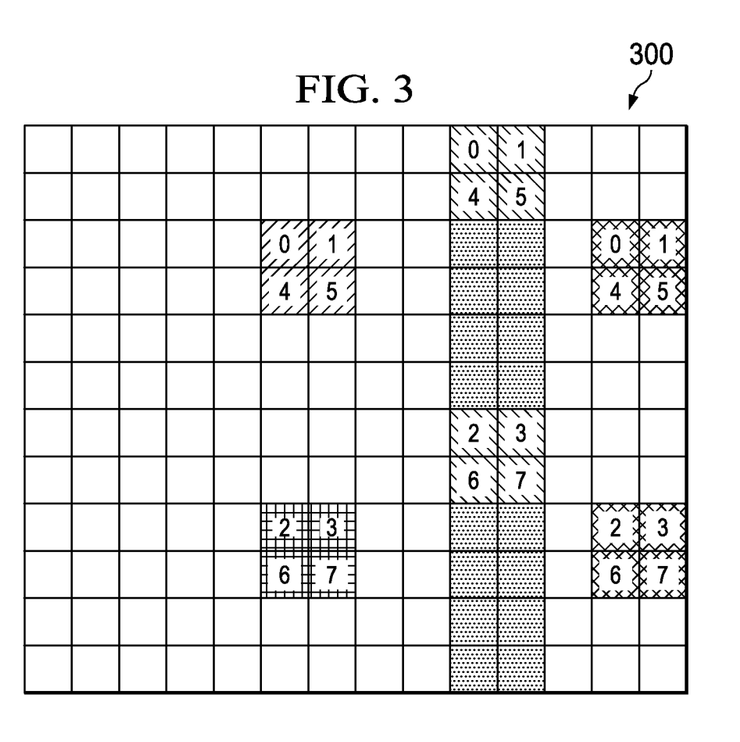
FIG. 3 illustrates example CSI-RS patterns for eight antenna ports.

FIG. 1 illustrates example CSI-RS patterns 100 using OFDM symbols with normal cyclic prefix (CP) for two antenna ports. There are 14 OFDM symbols labeled from 0 to 13. The CSI-RS patterns 100 are signaled from the wireless network to a UE. The symbols 0 to 6 correspond to even slots, and the symbols 7 to 13 correspond to odd slots. There are 12 subcarriers labeled from 0 to 11. The CSI-RS patterns 100 include three patterns that are obtain by shifts in frequency domain. Each pattern comprises a plurality of resource elements or blocks, where each resource block corresponds to one subcarrier and one symbol. The three patterns are indicated by different three corresponding shading patterns (two diagonal shading patterns and one diamond shading pattern). Other patterns with two antenna ports may also be obtained (for example in any of the blocks with gray shading). For each pattern, number "0" indicates a first antenna port of the UE (antenna port 0), and number "1" indicates a second antenna port of the UE (antenna port 1). FIG. 2 illustrates example CSI-RS patterns 200 using OFDM symbols with normal CP for four antenna ports. For each pattern, numbers "0", "1", "2", and "3" indicate four corresponding antenna ports. FIG. 3 illustrates example CSI-RS patterns 300 using OFDM symbols with normal CP for eight antenna ports. For each pattern, numbers "0" to "7" indicate eight corresponding antenna ports. Other CSI-RS patterns with extended CP can be defined similarly.

The resource element of each of the patterns above may be denoted by (k', l') per resource block, where the pair k' and l' indicates the subcarrier number and symbol number respectively in Physical resource block (PRB). All the CSI-RS patterns can be represented as shown in Table 1 below, where $n_s$ is the slot number. The CSI-RS patterns 100, 200, and 300 are signaled by the wireless network to a UE, e.g., by a base station (BS) or an E-UTRAN Node-B (eNB). The CSI-RS port number and CSI-RS configuration are also signaled to the UE via dedicated higher layer signaling in Release 10. The number of ports is signaled using 2 bits of data and the CSI-RS configuration is signaled using 5 bits of data.

The CSI-RS has a low density compared with the CRS. The subframe with CSI-RS transmission is defined by the duty cycle and subframe offset. For example, the duty cycle can be 5 milliseconds (ms), 10 ms, 20 ms, 40 ms, or 80 ms. The cycle and subframe offset for the CSI-RS are also signaled to the UE via dedicate higher layer signaling in Rel-10. A Rel-10 UE may assume PDSCH rate matching around the CSI-RS resource elements (REs), after UE capability (e.g., the UE's release) is known by the eNB or BS for all unicast PDSCH transmissions in any of the available transmission modes. For example, Table 1 shows that when a Rel-10 UE is configured in transmission mode 9, The UE uses the CSI-RS (for 1, 2, 4, or 8 antenna ports) for CQI/PMI feedback measurement.

TABLE 1

Mapping from CSI configuration to (k', l') for normal cyclic prefix.

| Frame struc-ture type | CSI Config-uration | Number of CSI reference signals configured | | | | | |
|---|---|---|---|---|---|---|---|
| | | 2 | | 4 | | 8 | |
| | | (k', l') | $n_s$ mod 2 | (k', l') | $n_s$ mod 2 | (k', l') | $n_s$ mod 2 |
| FS 1 & 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

In accordance to the 3GPP standard, which is incorporated herein, the configuration of multiple non-zero-power CSI-RS resources includes configuring the following parameters:

(1) antennaPortsCount, resourceConfig: independently configured among CSI-RS resources;
(2) subframeConfig: whether common or independent among CSI-RS resources;
(3) a configurable parameter to derive the pseudo-random sequence generator initialization ($c_{init}$): $c_{init}$ is independently configured among CSI-RS resources as:

$$c_{init}=2^{10}\cdot(7\cdot(n_s+1)+l+1)\cdot(2\cdot X+1)+2\cdot X+N_{CP},$$

where X is configurable in a UE specific manner and may take on any value in the range from 0 to 503. Other considerations include whether Rel-10 formula can be used without a change, whether beyond 503 values are supported, and whether CSI-RS ports always have the same scrambling or can have different scrambling within a CSI-RS resource;
(4) $P_c$: details of signaling can also be considered.

The CSI-RS may be interfered by the PDSCH of neighbor cells. Therefor, PDSCH RE muting is used to reduce the interference to the CSI-RS of neighbor cell(s). The following is agreed in 3GPP regarding muting:
(1) Muting configuration is signaled via dedicated higher-layer signalling: PDSCH muting is performed over a bandwidth that follows the same rule as the CSI-RS;
(2) A UE may assume downlink CSI-RS EPRE (energy per RE) is constant across the downlink system bandwidth and constant across all subframes until different CSI-RS information is received;
(3) The intra-subframe location of muted resource elements is indicated by a 16-bit bitmap: each bit corresponds to a 4-port CSI-RS configuration, all REs used in a 4-port CSI-RS configuration set to 1 (for example) are muted (zero-power assumed at UE), except for the CSI-RS REs if they belong to this CSI-RS configuration. This signaling is common for frequency division duplexing (FDD) and time division duplexing (TDD) CSI-RS configurations;
(4) When muting of PDSCH REs is configured: a Rel-10 UE may assume PDSCH rate matching around the muted REs (after UE capability, i.e. its release, is known by the eNB) for all unicast PDSCH transmissions in any transmission mode;
(5) One value of subframe offset and duty cycle is signaled for all the muted resource elements, using the same encoding as for the subframe offset and duty cycle of the CSI-RS: muted REs can be located in subframes either with or without CSI-RS. The subframe offset and duty cycle of the muted REs is indicated by a parameter separate from the parameter indicating the subframe offset and duty cycle of the CSI-RS.

Although muting is used to reduce the interference to CSI-RS of neighbor cells, there is no direct relationship between a muting pattern in a current cell and CSI-RS patterns of neighbor cells. In other words, the muting pattern can be configured in a cell independently. A CSI-RS pattern is signaled to the UE by radio resource control (RRC) signaling to support up to 8 transmission antennas. The signaling can be repeated periodically with a duty cycle and a subframe offset. To reduce the interference from and to the CSI-RS of neighbor cells, muting is applied to PDSCH transmission. In other words, the PDSCH transmission is configured to transmit nothing in the muted resource elements indicated by muting pattern. Signaling is sent to inform a Rel-10 UE of the muting pattern. Hence, the Rel-10 UE discards the muted resource elements in the reception of PDSCH. The muting pattern may be signaled by a 16 bit bitmap, where each bit represents a 4-ports CSI-RS pattern. For example, each bit is set to 1 to indicate that the 4-port CSI-RS pattern is muted, and is set to 0 to indicate that the 4-ports CSI-RS pattern is not muted.

Measurements and CSI feedback are one focus area in Coordinated Multi-Points (CoMP) and Heterogeneous Network (Hetnet) studies. In Rel-10, signal measurements at a UE are based on CSI-RS or CRS, and interference measurements at a UE are based on CRS. Subsequently, CSI reports are obtained at the UE from the signal measurements and interference measurements and fed back to the eNB. In Rel-10, only one type of signal measurements and one type of interference measurements are allowed. In this case, the signal from one transmission point and one interference condition are supported, with the exception of resource-restricted measurements. With resource-restricted measurements, at most two types of interference measurements are allowed. In this case, up to two interference conditions are supported, and these two interference conditions are semi-statically configured in a time division multiplexed (TDMed) manner over the subframes.

The measurements and CSI feedback mechanism is insufficient or unsatisfactory for Rel-11 and onward. Multiple types of signal measurements may be supported in order to support multiple transmission points in CoMP. However, a method for flexibly supporting multiple types of interference measurements with reasonable accuracy, overhead, and complexity is challenging to achieve and is highly desired. In various embodiments herein, systems and methods for improved measurements and CSI feedback are provided. Embodiment methods include signaling a plurality of CSI resources for signal and interference measurements to a UE. The embodiment methods also include signaling a configuration of measurements report to be returned by the UE. Upon receiving the signaling of CSI resources and configuration of measurements report, the UE performs signal measurements using the indicated resources, and hence sends a measurements report or feedback in accordance with the indicated configuration.

The signaling of CSI resources and configuration of measurements report includes a first signaling that indicates CSI resources to be used by the UE for signal measurements, a second signaling that indicates CSI resources to be used by the UE for interference measurements, and a third signaling that indicates a CQI report configuration for the UE. The CQI report configuration may indicate indexes for linking different CQI reports to corresponding subsets of the indicated RS resources for signal and corresponding subsets of the indicated interference measurements. The embodiments may allow relatively high flexibility of measurements/CSI feedback/transmissions as well as different types of transmission schemes that can be supported by CoMP, HetNet, and other transmission schemes. For example, the Rel-10 almost blank subframe (ABS) based Enhanced Inter-Cell Interference Control (eICIC) can be realized by CoMP CSI feedback without resorting to traditional techniques used for eICIC (e.g., resource-restricted measurements). Some embodiments also allow ABS-based eICIC to be configured together with the CoMP CSI feedback.

The three signaling components for CSI measurements and feedback for signal/channel measurements, interference measurements, and CQI calculation and report or feedback, are sent from the wireless network to the UE. The signaling components may be coupled with each other, e.g., signaled at about the same time, or combined as one or two signaling components.

The signal measurements can be based on general RS, for instance, either CRS or non-zero-power (NZP) CSI-RS, e.g., depending on the transmission mode. In 3GPP LTE Rel-11, NZP CSI-RS is used for signal/channel measurements. In CoMP, multiple NZP CSI-RSs can be configured for each UE to measure the signals from multiple transmitting points. Thus, the network configures and signals multiple NZP CSI-RS resources to each UE for signal measurements.

For interference measurements, CoMP transmission may require one or more types of interference conditions to be measured based on UE specifically configured REs or CRS. In 3GPP LTE Rel-11, the candidates for UE specifically configured CRS include NZP CSI-RS and zero-power (ZP) CSI-RS. Embodiments below generally are described for the case of NZP/ZP CSI-RS based interference measurements. However, the same concepts apply to more generic designs, such as interference measurements based on UE specifically configured REs, including for example CSI-RS REs, part or entire CRS REs, part or entire PDSCH REs, new designed RS REs, and/or other determined REs. In general, the resource on which the interference measurements are performed is called an interference measurement (IM) resource.

The interference conditions that a UE may experience in CoMP can vary dynamically depending on the scheduling decision, such as in Dynamic Point Selection (DPS) or Dynamic Point Blanking (DPB). The CSI-RS resources for interference measurements for DPS (or likewise, DPB) may be semi-statically configured and coordinated by eNBs, and they are not necessarily tied to the PDSCH resources dynamically allocated for DPS (or DPB) transmissions. In contrast, when Rel-10 resource-restricted measurements are used, up to two types of interference conditions are to be measured, and the measurements are based on the CRS. The two interference conditions in resource-restricted measurements correspond to two semi-statically configured subframes subsets, and the resources used to measure each interference condition may be located in the associated subset. The conditions in Table 2 are observed of interference measurements used in CoMP CSI feedback and resource-restricted measurements.

TABLE 2

Comparison of interference measurements used in CoMP CSI feedback and resource-restricted measurements.

| | Interference measurement resource | Interference conditions/ transmission schemes |
|---|---|---|
| CoMP | on semi-statically configured REs (CSI-RS) | dynamically varying |
| Resource-Restricted Measurements | on CRS of semi-statically configured subframes | semi-statically varying |

As shown in Table 2, the interference measurement mechanisms for CoMP schemes and schemes with resource-restricted measurements appear different. However, carefully examining these two mechanisms can reveal that both require the resources used for interference measurements to be semi-statically configured and properly coordinated by eNBs. Such resources are subject to certain restrictions so that they correspond to the eNB-intended interference condition or interference hypothesis. Thus, it may be beneficial and feasible to focus on this commonality and provide a common interference measurement mechanism for both CoMP schemes and semi-static coordination schemes with the capability of measuring multiple interference conditions that are common in CoMP and HetNet scenarios.

In an embodiment, a common interference measurement mechanism is used for both CoMP schemes and semi-static coordination schemes. The common mechanism is based on IM resources for interference measurements, which, in the special case of 3GPP LTE Rel-11, becomes the channel-state information interference-measurement (CSI-IM) resource. Accordingly, each CSI-IM resource is used for measuring one interference condition, which may allow a multiple-to-one relation between the CSI-IM resources and the interference condition. Two CSI-RS resources may be sufficient to achieve the functionality provided by resource-restricted measurements of measuring two interference conditions. More CSI-RS resources can also be used to measure more than two interference conditions. Therefore, the eNB configures and signals multiple CSI-RS resources for interference measurements (or CSI-IM resources, or general IM resources)

A plurality of options may be implemented for providing the signaling for CSI-RS based interference measurements. In a first option, the signaling for NZP/ZP CSI-RS based interference measurements is a signaling independent of the signaling for signal measurements. For instance, in addition to the signaling of multiple NZP CSI-RS resources configured for signal measurements, an eNB signals multiple CSI-RS (with zero-power or non-zero-power CSI-RS) resources to each UE for interference measurements, and the format and/or content of the signaling may reuse or partially reuse the signaling for the NZP CSI-RS or ZP CSI-RS. In a second option, the signaling for CSI-RS based interference measurements is a signaling combined with other signaling, such as that for signal measurements. For instance, in addition to the data fields in CSI-RS resources configured for signal measurements or muting, another field is added to indicate if this CSI-RS resource is used for signal measurements, interference measurements, and/or Radio Link Monitoring (RLM)/Radio Resource Management (RRM) measurements. This added field may also be an independent signaling or a part of another signaling (such as part of the CQI resource signaling described below).

For any of the options above, each IM resource is used for measuring one interference condition, or multiple IM resources can also be configured for measuring the same interference condition. In the latter case, the eNB(s) guarantees that these IM resources correspond to the same interference condition. The configured IM resources can be used for measuring various interference conditions in CoMP and HetNet. For example in CoMP, one CSI-IM resource is configured and signaled to measure the interference from outside a CoMP set for a UE, and one CSI-IM resource is configured and signaled to measure the interference from some or all transmission points inside a CoMP set for a UE and further the interference outside the CoMP set for the UE. Additionally, one CSI-IM resource can be configured and signaled to measure the interference from outside a CoMP set for a UE but some transmission point(s) outside the CoMP set may be transmitting with certain interference coordination constraints. The interference coordination constraints may include muting or transmitting with reduced power, transmitting with certain spatial directions to be avoided (i.e., nulling in certain directions), or transmitting only along certain directions.

Further, a UE may need to feedback multiple CQI reports to support CoMP schemes or resource-restricted measurements based schemes. Each CQI report is associated with one CQI hypothesis which specifies one signal condition and one interference condition. For each CQI report, the signal condition is associated with one or more CSI-RS resources used for signal measurements, as indicated by the eNB. The support of Joint Transmission (JT) may require more than one CSI-RS resources to be used. For each CQI report, the interference condition can be associated with one or more CSI-IM resources used for interference measurements, as indicated by the eNB. The UE side interference adjustments may or may not be needed. To simplify UE implementation, the eNB configures the interference measurements such that no UE side adjustment is needed. To guarantee this, the eNB is configured to ensure that the CSI-IM resources used for interference measurements correspond to the same type of interference condition.

To achieve the above conditions for each CQI report, the eNB configures and signals the CSI-RS resources to be used for signal measurements and the CSI-IM resources to be used for interference measurements. The UE calculates each CQI based on the indicated CSI-RS resources and CSI-IM resources, and the eNB assumes the UE does not perform UE side interference or CQI adjustments. Accordingly, the interference measurements and CQI calculation is based on appropriate and restricted resources that correspond to the intended interference condition.

In an embodiment, an eNB signals a set of CQI configurations to a UE, which instructs the UE to generate and transmit the CQI reports with determined periods and subframe offsets according to the configurations. The CQI configurations also instructs the UE to generate each CQI report based on a subset of CSI-RS resources for signal measurements and a subset of CSI-IM resources for interference measurements, which are also signaled by the eNB as described above. The subsets of signal and/or interference measurement resources are indicated in each CQI configuration signaled by the eNB. As an example, the subset corresponds to a bitmap contained in each CQI configuration signaled by the eNB. If a bit in the bitmap is set (or not set), then the corresponding CSI-RS resource or the corresponding CSI-IM resource is used for the CQI computation, which provides high flexibility of supporting a variety of CQI hypotheses with reduced signaling overhead. In another example, the restricted resource for signal and/or interference measurement is signaled explicitly as the CSI-RS resources in each CQI configuration, which has very high flexibility at a price of much higher signaling overhead.

In yet another example, the restricted resource for signal and/or interference measurements is signaled by indexing in each CQI configuration the configured set of the CSI-RS resources. For instance, a UE receives a signaling indicating that a number of three CSI-RS resources are configured for signal measurements, which are indexed as 0, 1, and 2. The UE also receives a signaling indicating that the same or different number of CSI-IM resources are configured for interference measurements, which are indexed as 0, 1, and 2 (for example in the case of three CSI-IM resources for interference measurements). In addition, the UE receives a signaling indicating that a number of four CQIs, for example, are to be reported. As an example, the signal includes the following information specifying the measurement resources: CQI0—(0,0), CQI1—(0,2), CQI2—(1,1), and CQI3—(2,2), where CQIn—(i,j) indicates computing the n-th CQI from the i-th signal measurement (based on the i-th CSI-RS resource for signal measurement) and the j-th interference measurement (based on the j-th CSI-IM resource for interference measurement). An advantage of this embodiment method is that the signaling overhead may be reduced if some or all of the multiple CQIs share a same RS resource and/or a same IM resource. Flexible combinations of the signaled RS resources and the signaled IM resources to obtain the desired CQIs are supported.

Although the above example is described as one CSI-RS resource used for signal measurement and one CSI-IM resource used for interference measurement, the signaling can indicate more than one CSI-RS resources used for signal measurement and more than one CSI-IM resources used for interference measurement for generating one CQI report. This may be indicated using the format CQIn−([$i_1, i_2, \ldots, i_k$],[$j_1, j_2, \ldots, j_m$]), where the i's specify signal measurement resources and the j's specify interference measurement resources. The signaling for CQI report configuration may further indicate mathematical operations to be used by the UE, such as, for example, adding the interference measurement associated with $j_2$ to $j_1$, and then subtracting the interference measurement associated with $j_3$, for which additional bits are needed in the signaling.

In an embodiment, the eNB signals the CSI-RS for RLM/RRM measurement independent of or combined with the signaling for CQI/PMI/RI feedback measurements (including signal/channel measurements and/or interference measurements). The CSI-RS for RLM/RRM may include the normal CSI-RS for Rel-10 UE, the new CSI-RS for Rel-11 and/or beyond UE, or combinations thereof. The signaling may inform the UE which antenna ports are within one group. The RLM/RRM measurement can be reported per group of signaled antenna ports. For example, the measurement of a group of antenna ports is reported similar to the report of the measurement for the antenna ports of a cell. Thus, the measurement and/or report of multiple groups of antenna ports is obtained similar to that of the antenna ports of multiple cells.

Based on the RLM/RRM measurement, the eNB can signal the CSI-RS for CQI/PMI/RI feedback measurement to the UE. Hence, the signaling of CSI-RS may be used for either CQI/PMI/RI feedback measurement or RRM/RLM measurement (for example, Reference signal received power (RSRP) measurement in 3GPP). The signaling of CSI-RS may include information to indicate whether the signaling is for RRM/RLM or CQI/PMI/RI.

Figure 4:
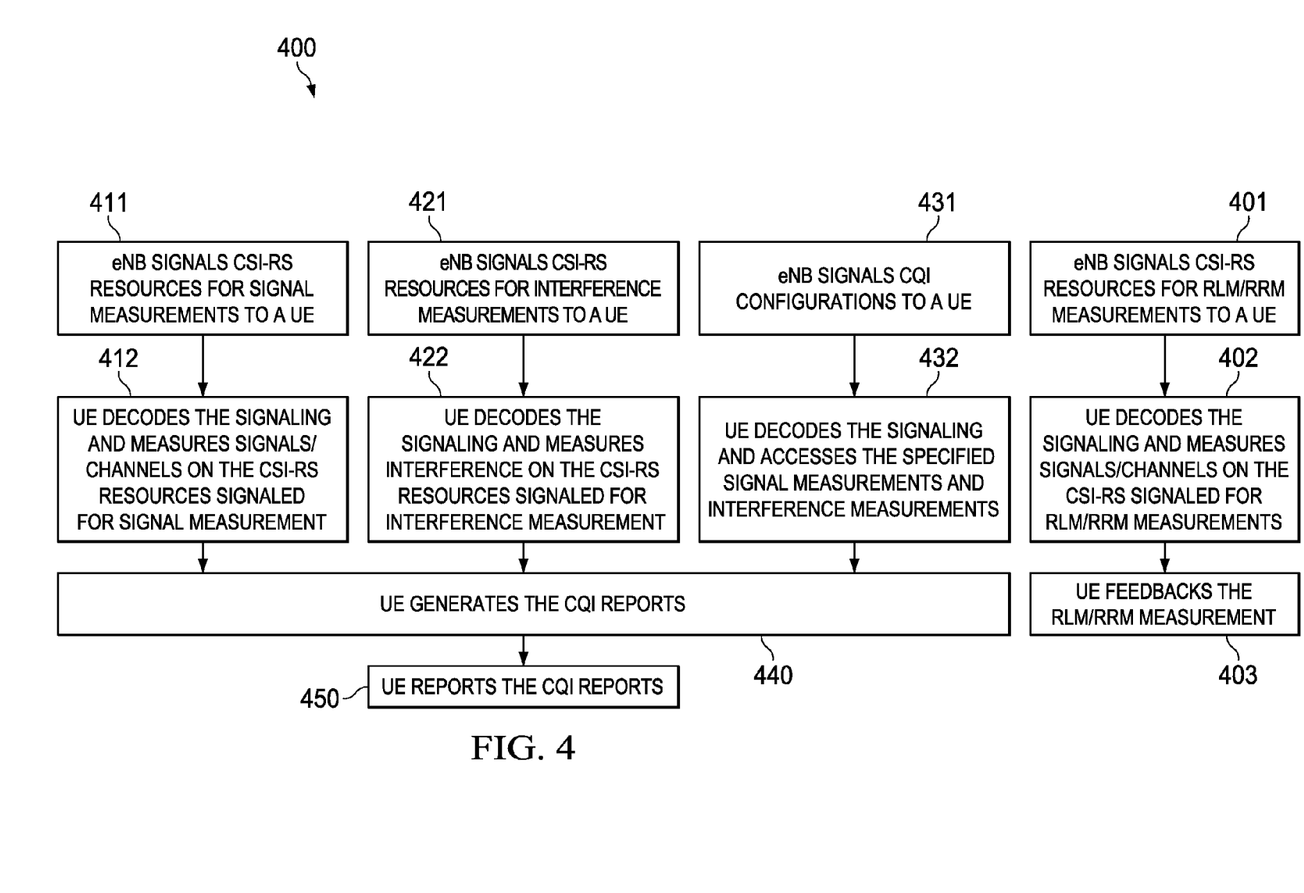
FIG. 4 illustrates an embodiment measurement and CSI configuration and feedback method.

FIG. 4 illustrates an embodiment measurement and CSI configuration and feedback method 400 that includes some of the features described above. Initially, at step 401, the eNB signals CSI-RS resources for RLM/RRM measurements to the UE. At step 402, the UE receives and decodes the signaling and then measures signals/channels on the CSI-RS resources signaled for RLM/RRM measurement. At step 403, the UE returns the RLM/RRM measurement(s). Next, at step 411, after receiving the RLM/RRM measurement(s) from the UE, the eNB signals CSI-RS resources for signal measurements to the UE, which then, at step 412, receives and decodes the signaling and measures signals/channels on the CSI-RS resources signaled for signal measurement. At step 421, the eNB signals CSI-IM resources for interference measurements to the UE, which then, at step 422, receives and decodes the signaling and measures interference on the CSI-RS resources signaled for interference measurement. At step 431, the eNB signals CQI configurations to the UE, which then, at step 432, receives and decodes the signaling and assesses the specified signal measurements and interference measurements. The steps 411 to 432 may be implemented in any appropriate and logical order. At step 440, the UE generates the CQI reports according to the signaled CQI configurations based on the signaled signal measurements and interference measurements. At step 450, the UE reports the CQI reports to the eNB.

Figure 5:
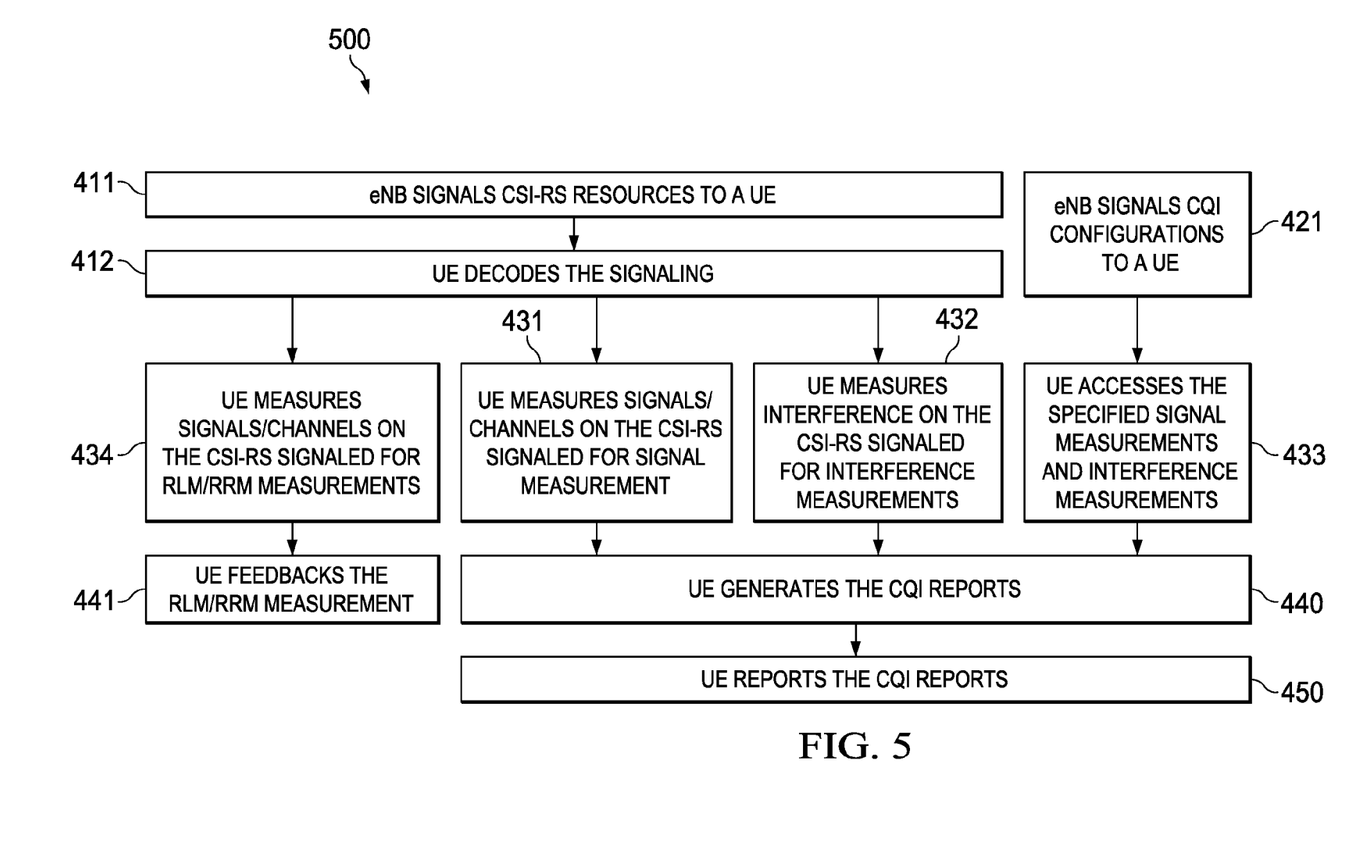
FIG. 5 illustrates another embodiment measurement and CSI configuration and feedback method.

FIG. 5 illustrates another embodiment measurement and CSI configuration and feedback method 500 that includes some of the features described above. Initially, at step 411, the eNB signals NZP/ZP CSI-RS resources to the UE. At step 412, the UE receives and decodes the signaling from the eNB. At step 421, the eNB signals CQI configurations to the UE. At step 431, the UE measures signals/channels on the CSI-RS resources signaled for signal measurements. At step 432, the UE measures interference on the CSI-RS resources signaled for interference measurements. At step 433, the UE assesses the specified signal measurements and interference measurements. At step 434, the UE measures signals/channels on the CSI-RS resources signaled for RLM/RRM measurements. The steps 431 to 434 may be implemented in any appropriate and logical order. At step 440, the UE generates the CQI reports according to the signaled CQI configurations.

There are several resource-restricted measurements based schemes, including eICIC or Further Enhanced Inter-Cell Interference Control (FeICIC) schemes with zero-power or reduced-power ABS, and Coordinated Beam Blanking (CBB) which is a form of a CoMP Coordinated Scheduling (CS)/Coordinated Beam-forming (CB) scheme. Such schemes may be viewed as special types of CoMP schemes with semi-static coordination, and consequently, they can use the CoMP CSI schemes described above for their CSI measurements and reports. In this case, the semi-static resource-restricted measurements are not needed, since the dynamic CoMP measurements and feedback scheme may be sufficient. In other words, subframe-level semi-static blanking/coordination (which generally restricts the data transmissions, e.g. PDSCH transmissions, to be semi-statically configured in a similar pattern as measurement resources) may be replaced by CSI-RS resource level semi-static blanking/coordination (which may allow more flexibility on data transmissions).

For example, in ABS-based eICIC, the Pico configures the following CSI-RS resources:
(1) One set of NZP CSI-RS to measure Pico signals;
(2) One set of NZP/ZP CSI-RS for interference measurements for Macro ABS. This CSI-RS is not necessarily located in the Macro ABS, since the Macro can mute on the CSI-RS REs on which the UE's interference measurements are established. In other words, the Macro muting is not necessarily done on Macro PDSCH; it may be done only on some Macro REs corresponding to the UEs interference measurements without Macro interference. Alternatively, the Macro may simply mute on both CSI-RS REs and some or all other REs, which may effectively make the entire subframe an ABS;
(3) One set of NZP/ZP CSI-RS for interference measurements for Macro non-ABS. This CSI-RS is not necessarily located in the Macro non-ABS, since the Macro can transmit on the CSI-RS REs (generally, the UE is signaled to discard those REs) on which the UE's interference measurements are established. In other words, the Macro transmission is not necessarily Macro PDSCH transmission; the Macro transmission may be only on some Macro REs corresponding to the UEs interference measurements with Macro interference. Alternatively, the Macro may transmit on both CSI-RS REs and some or all other REs, and the transmission is of the same type as the desired interference condition to Pico UEs.

If dynamic Macro-Pico coordination is allowed, then it is possible to decouple the measurements/CSI feedback and other transmissions (such as PDSCH transmissions) by utilizing the CoMP feedback schemes described above. Macro-Pico can dynamically decide if the Macro would blank on a certain time/frequency/spatial-domain resources as long as the measurement resources (NZP/ZP CSI-RS) for signal and interference are configured and coordinated accordingly. Therefore, the requirement on semi-statically configured ABS pattern for eICIC may be relaxed. This is enabled by CSI-RS based interference measurements and not typically with CRS based interference measurements. For the case of zero-power ABS based solution, the dynamic interference coordination for PDSCH transmission leads to a scheme in the DPB category. For other or more general cases, the resulting schemes are not DPB.

Figure 6:
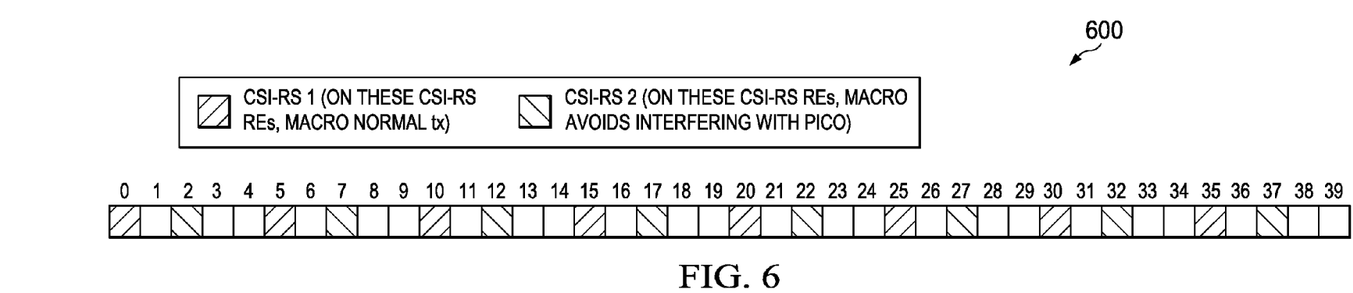
FIG. 6 illustrates an embodiment cooperative multi-point (CoMP) feedback used for resource-restricted measurements.

FIG. 6 illustrates an embodiment CoMP feedback 600 that is used for resource-restricted measurements, for example over 40 subframes. Pico UE sends two CSI reports, each based on one set of CSI-RS. Dynamic eICIC can be achieved using this following mechanism. If a Macro-Pico pair decides that the Macro mutes on certain RBs, then on those RBs, the Macro stops transmission and the Pico uses a low-interference CSI for scheduling/precoding. No subframe subsets that may restrict scheduling/transmission are needed for achieving eICIC. The CSI-RS based interference measurements for resource-restricted measurements can also be implemented, which provides higher flexibility than CRS based interference measurements for resource-restricted measurements.

With regard to reference resources, the resource-restricted measurements with CRS based interference measurements uses the latest subframe in the restricted subset as the reference resource (subject to the timing constraint that the reference resource is at least four subframes earlier than the reporting subframe). This definition of reference resource may not be adopted for resource-restricted measurements with CSI-RS based interference measurements (i.e. CSI-IM), since the so defined subframe may not contain any CSI-RS configured for interference measurements (i.e. CSI-IM resources). This can be resolved by modifying the reference resource as the latest CSI-RS bearing subframe in the restricted subset (also subject to the timing constraint that the reference resource is at least four subframes earlier than the reporting subframe). The reference resource may be further restricted to be the latest CSI-RS REs (as opposed to the subframe) in the restricted subset.

With regard to the number of CSI-IM configurations, since one CSI-IM configuration may span in only one subset of subframes, at least two CSI-IM configurations may be used for interference measurements. In addition, more CSI-IM configurations may be used to prevent further "dilution" of CSI-IM resource density, thus improving the measurement accuracy. If any of the CSI-IM configurations spans across both restricted subsets, each of the resource-restricted CSI reports is linked to the CSI-IM resources in only one subset and does not utilize any CSI-RS resources in the other subset. A benefit of configuring a UE with CSI-IM resource for interference measurement and with resource-restricted measurement (as opposed to configuring CSI-IM resource for interference measurement to effectively realize resource-restricted measurement as mentioned above) is supporting a mixture of Rel-10 UEs and Rel-11 and beyond UEs at the same time. In other words, resource-restricted measurement based on subframe subsets may need to be configured for supporting Rel-10 UEs, and hence it may be useful to configure Rel-11 UEs with subframe subsets as well on top of their CSI-IM resource based interference measurement. However, if the support of Rel-10 UEs is not needed, then the method of CSI-IM resource based interference measurement may be preferred to effectively realize resource-restricted measurement for its high flexibility and more functionality.

Figure 7:
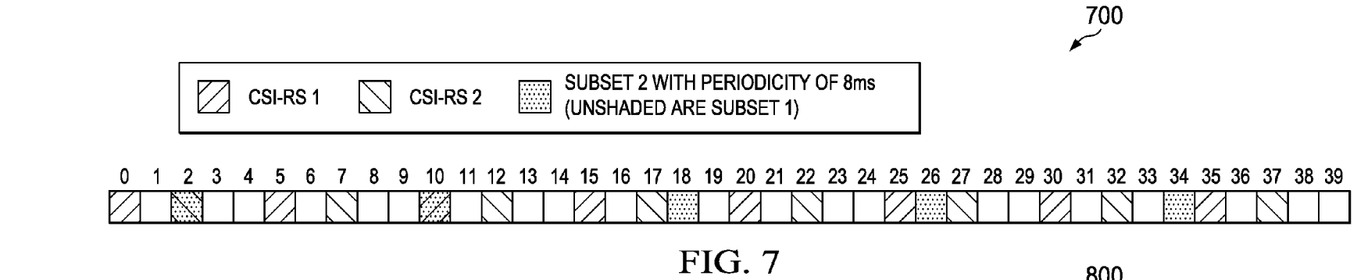
FIG. 7 illustrates an embodiment of two interference measurement CSI-RS configured for resource-restricted measurements.

FIG. 7 illustrates an embodiment of two interference measurement CSI-IM resources 700 configured and used for resource-restricted measurements, for example over 40 subframes. A first subset (subset 1) of interference measurements can use all CSI-IM resources in subset 1 (including both CSI-IM resource 1 and CSI-IM resource 2 in this example), and a second subset (subset 2) of interference measurements can use all CSI-IM resources in subset 2 (including both CSI-IM resource 1 and CSI-IM resource 2 in this example). However, not all subframes are used as reference resources. The interference measurements on CSI-IM resources 1 and 2 in subset 1 are not necessarily used for a same CQI in subset 1. Similarly, the interference measurements on CSI-IM resources 1 and 2 in subset 2 are not necessarily used for a same CQI in subset 2.

The resource-restricted measurements based feedback may not be sufficient for general CoMP schemes. The CoMP schemes with semi-static coordination may adopt resource-restricted measurements for the CSI measurements and reporting, i.e., use the resource-restricted measurements for interference measurements and CSI feedback. Compared to CoMP feedback without resorting to restricted subsets to realize the functionalities of resource-restricted measurements, the schemes with resource-restricted measurements have the advantage of lower complexity since over one subset, the Macro does not need to "emulate" the interference seen by Pico UEs over the other subset.

Figure 8:
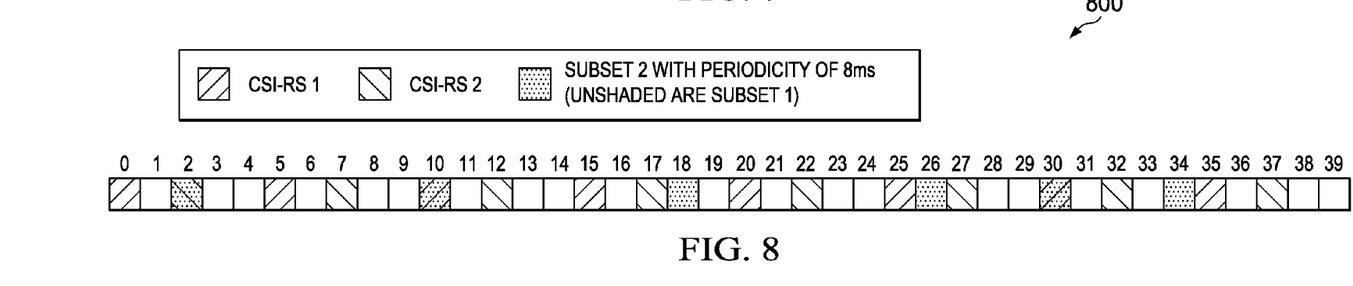
FIG. 8 illustrates embodiment resource-restricted measurements configured for some CoMP schemes.

FIG. 8 illustrates embodiment resource-restricted measurements 800 configured and used for CoMP schemes with semi-static coordination, such as CBB. The CSI reports for a first subset (subset 1), on which the Macro performs normal transmission, use the CSI-IM in subset 1 for interference measurements. The CSI reports for a second subset (subset 2), on which the Macro avoids interfering certain or determined spatial directions with or without reduced power, use the CSI-IM in subset 2 for interference measurements.

In Release-11 and/or beyond, there are four scenarios described in TR 36.819, which is incorporated herein by reference:
Scenario 1: Homogeneous network with intra-site CoMP;
Scenario 2: Homogeneous network with high transmission power Remote Radio Heads (RRHs);
Scenario 3: Heterogeneous network with low power RRHs within the macrocell coverage where the transmission/reception points created by the RRHs have different cell IDs as the macro cell;
Scenario 4: Heterogeneous network with low power RRHs within the macrocell coverage where the transmission/reception points created by the RRHs have the same cell IDs as the macro cell.

In scenario 4, a single shared cell-ID is used for multiple sites. In this case, cell-ID based transmission set configuration is not applicable. CSI-RS based configuration can be used for scenario 4 instead of cell-ID based configuration. For the multiple cell-IDs case in scenario 3, the UE may not need to know whether there is an actual cell corresponding to a CSI-RS pattern in order to use the CSI-RS pattern for PMI/CQI feedback measurement besides the signaled CSI-RS pattern. Even though there is another neighbor cell, the current cell can borrow the antennas from the neighbor cell for data transmission of UE within the current cell by directly informing a CSI-RS pattern of antennas of neighbor cell to a UE, without the need to inform the UE that there is a neighbor cell. By directly signaling the CSI-RS patterns to a UE, the UE doesn't need to blindly detect the signaling in neighbor cells to use the CSI-RS patterns. Regardless of scenario 3 or scenario 4, the eNB(s) or the network point(s) can signal to a UE one or multiple CSI-RS resources/patterns with same or different CSI-RS scrambling codes, and hence the UE may or may not know (or may or may not need to know) if the CSI-RS resources/patterns are associated with one eNB (or network point) or multiple eNBs (or network points).

Figure 9:
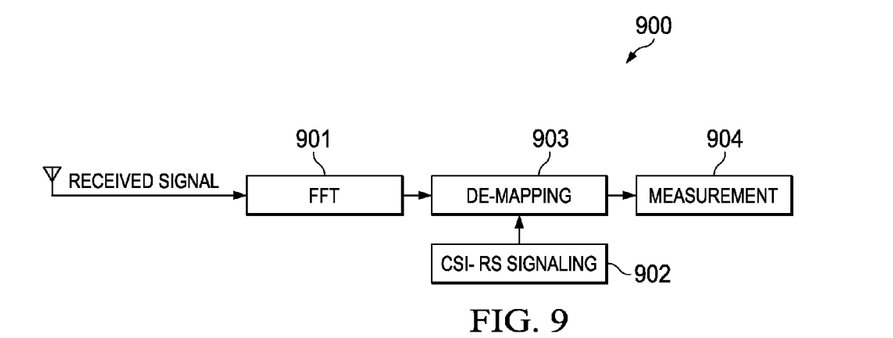
FIG. 9 illustrates an embodiment reception method.

FIG. 9 illustrates an embodiment reception method 900 that can be implemented at a UE as part of or to support the measurement and CSI configuration and feedback schemes and methods above. At step 901, the received signal (at the UE side) is transformed by FFT, and then turned into a frequency domain signal per OFDM symbol. At step 902, the UE decodes the signaling from the eNB to obtain the CSI-RS. Using this information, de-mapping is implemented at step 903 to obtain the CSI-RS signal. At step 904, this CSI-RS signal is used for channel estimation and measurement, where the CSI-RS signal is estimated based on the CSI-RS signal.

In Rel-10, a scramble code is determined using a slot number and a cell-ID, e.g., an initial phase of a Gold sequence is determined by the slot number and cell-ID. This scrambling code generation scheme may be used in the method 900, since the CSI-RS may be borrowed from neighbor cells. Hence, in the signaling of the CSI-RS, the subframe number or slot number is also indicated (to the UE), e.g., assuming that not all the CSI-RSs have an aligned slot number to generate scrambling code. For instance, a subframe shift is used for a cell to avoid interference of PBCH between the cell and neighbor cells. Hence, the UE needs to know the subframe or slot number to generate the CSI-RS scrambling code.

In case of actual deployment, two cells may have time domain multiplexing (TDM) CSI-RS patterns in different subframes instead of FDM CSI-RS patterns. Thus, some but not all neighbor cells in the CoMP set use the same subframe for their CSI-RS. For example, in case of the HetNet scenario, two sets of CSI-RS ports in different subframes may be defined for interference measurement and two CQI/PMI feedbacks may be measured and reported independently. Hence, in the signaling of CSI-RS, the signaling may include a duty cycle and an offset for each subset of CSI-RS ports (or each CSI-RS pattern) to support defining multiple TDMed sets of CSI-RS ports. The interference measurement may be signaled. However, two CSI-RS patterns may be located in different subframes, and hence the interference may be different in different subframes. As such, a signaling may indicate a set of CSI-RS for interference measurement. This set of CSI-RS for interference measurement may be a subset of the CSI-RS signaled for CQI/PMI/RI or RRM/RLM measurement.

Furthermore, in neighbor cells, zero-power CSI-RS may be configured, e.g., muting for PDSCH is adopted and some cells' interference is muted. Hence, not every CSI-RS is used to measure the interference. To enable measurement of the interference of a cell, muting is not adopted for that cell for the CSI-RS for interference measurement. The signaling of CSI-RS may include information indicating CSI-RS for interference measurement as described above. Multiple sets of CSI-RSs for interference measurement may be signaled, which may be based on TDM, frequency domain multiplexing (FDM), or code division multiplexing (CDM). The CSI-RS for interference measurement may be a non-zero-power CSI-RS, a zero-power CSI-RS, or includes both zero-power CSI-RS and non-zero-power CSI-RS. The signaling of CSI-RS can be applied for zero-power CSI-RS and also non-zero-power CSI-RS.

In an embodiment, the signaling for CSI-RS includes a subframe number and/or slot number, a scrambling code, some indication on interference measurement, an indication of RRM/RLM measurement or CQI/PMI/RI measurement, a duty cycle and offset for each CSI-RS pattern or each subset of CSI-RS ports, or combinations thereof. Multiple sets of CSI-RS for interference measurement may be signaled and used. The CSI-RS signaling may indicate a subset of CSI-RS for interference measurement using a bitmap method based on a signaled set of CSI-RS ports.

In the case of a NZP CSI-RS configuration, according to the RAN1#67 for Rel-11, the configuration of each non-zero-power CSI-RS resource includes a configurable parameter to derive the pseudo-random sequence generator initialization ($c_{init}$). The parameter $c_{init}$ is independently configured among CSI-RS resources, such that $$c_{init}=2^{10} \cdot (7 \cdot (n_s+1)+l+1) \cdot (2 \cdot X+1)+2 \cdot X+N_{CP},$$

where X is configurable in a UE-specific manner and may take on any value in the range of 0 to 503. In Rel-10, the pseudo-random sequence generator may be initialized at the start of each OFDM symbol with $c_{init}=2^{10} \cdot (7 \cdot (n_s+1)+l+1) \cdot (2 \cdot N_{ID}^{cell}+1)+2 \cdot N_{ID}^{cell}+N_{CP}$. Considering the application of CoMP without carrier aggregation for simplicity, the cell ID is derived by the UE according to the primary cell.

If the initialization is performed as in Rel-10 when a UE receives RRC signaling with the configuration of multiple non-zero-power CSI-RS resources, then all CSI-RS ports in all the non-zero-power CSI-RS resources may be assumed by the UE to be scrambled by the same sequence associated with the primary cell. This is in a scenario with CoMP transmission points belonging to different cells. If the initialization is performed flexibly with parameter X independently configurable per CSI-RS resource and assuming one value of X per CSI-RS resource, then each CSI-RS resource can be associated with a different sequence. Thus, the CSI-RS ports sent from a transmission point belonging to a particular cell can be scrambled by the sequence associated with this cell, and not the primary cell of the UE.

In one example, the CoMP measurement set comprises 3 transmission points, each belonging to a different cell. Additionally, the network comprises a mixture of Rel-11 and Rel-10 UEs that rely on CSI-RS for feedback. Each transmission point (TP) provides the UEs with CSI-RS for CSI feedback. Rel-10 UEs assume that CSI-RS ports are scrambled with a sequence initialized according to the cell identity of their respective primary cell. Therefore, each TP sends one CSI-RS resource with scrambling according to Rel-10. In addition, each TP sends one CSI-RS resource for CoMP measurements by Rel-11 UEs located in the two cooperating cells. With the flexible configuration of parameter X, the same CSI-RS resource as for Rel-10 UEs can be reused by Rel-11 UEs. With the inflexible configuration according to Rel-10, each transmission point sends two additional CSI-RS resources with the same ports as the CSI-RS resource configured for Rel-10 UEs, where each CSI-RS resource is scrambled with the cell identity of each of the two cooperating cells.

In the formula of initial value for pseudo-random sequence generator, the initial value depends on the slot number $n_s$ where the CSI-RS resource is present and the slot number $n_s$ in a frame ranges from 0 to 19. The UE can detect the slot number of the serving cell based on a shared channel (SCH) channel. When multiple CSI-RS in a subframe have the same slot number, there is no need to inform the slot number to generate the pseudo-random sequence for multiple CSI-RS. However, if a CSI-RS resource is transmitted by a neighbor cell, which has a slot/subframe shifting relative to the serving cell, then the CSI-RS resource of the neighbor cell may not have the same slot number as the serving cell. Therefore, information about the slot number is indicated per CSI-RS resource. For example, in case of scenario 3 above, there may be a slot or subframe shift between two cells to avoid interference due to PBCH, PCH, etc.

The subframe-level shifting can be used to offer adequate interference protection in HetNet. Therefore, the eNB can provide the additional signaling of subframe offset $D_n$ per non-zero-power CSI-RS resource, as follows:

$$c_{init}=2^{10} \cdot (7 \cdot ((n_s+D_{ns}) \bmod 20+1)+l+1) \cdot (2 \cdot X+1)+2 \cdot X+N_{CP},$$

Where X is configurable in a UE-specific manner, X may take on any value in the range of 0 to 503, $D_{ns}$ is relative to subframe 0 of the serving cell, and $n_s$ is the slot number of the serving cell derived by the UE.

To support coherent joint transmission in Rel-11, and improve flexibility, inter-CSI-RS-resource phase information may be reported along with per-CSI-RS-resource PMI. Alternatively, one PMI may be reported relative to all the ports in multiple CSI-RS resources. This approach may be referred to as "CSI aggregated across multiple CSI-RS resources". This approach has two drawbacks if no new codebook is specified. The first drawback is that the PMI size is limited to 2, 4 or 8. The second drawback is that the inter-point phase information cannot be further optimized and is constrained by the Rel-8 and Rel-10 codebooks. This approach also requires signaling to inform the UE to aggregate multiple CSI-RS resources into a single PMI. Since the UE is also expected to support per-CSI-RS-resource PMI feedback, the signaling for switching between the two types of feedback is required. The aggregated CSI across multiple transmission points may not be sufficiently efficient for supporting coherent joint transmission in Rel-11.

In an embodiment, to support one PMI across multiple transmission points, multiple transmission points are aggregated into a single CSI-RS resource, which may avoid the extra signaling for switching with per-CSI-RS-resource CSI feedback. In shared cell ID scenarios, it is straightforward or relatively simple to aggregate CSI-RS ports sent by different points that share the same cell ID within one CSI-RS resource, and thus initialize the sequence for all CSI-RS ports with the same cell ID.

In scenarios 1, 2 and 3 above where transmission points belong to different cells, aggregating CSI-RS ports within the same CSI-RS resource may require configuring independently the scrambling initialization for each port within the same CSI-RS resource. Otherwise CSI-RS overhead is sacrificed due to the requirement to support Rel-10 UEs. In one implementation, the CoMP measurement set comprises 2 transmission points, each belonging to a different cell. Additionally, the network comprises a mixture of Rel-11 and Rel-10 UEs that rely on CSI-RS for feedback. The scrambling initialization is independent per CSI-RS resource, where the sequence per port is independent within a CSI-RS resource or the same sequence is adopted for all ports within a CSI-RS resource.

The lack of flexibility to configure CSI-RS ports with different sequences within one CSI-RS resource incurs more overhead. In an embodiment, if the support of inter-CSI-RS resource phase feedback is not specified in Rel-11, the network has the capability to configure CSI-RS ports with different sequences within a CSI-RS resource to support coherent joint transmission. If inter-CSI-RS-resource phase feedback is not specified, CSI-RS ports can be configured to have different sequences within a CSI-RS resource, i.e., X is configurable independently per CSI-RS port.

Figure 10:
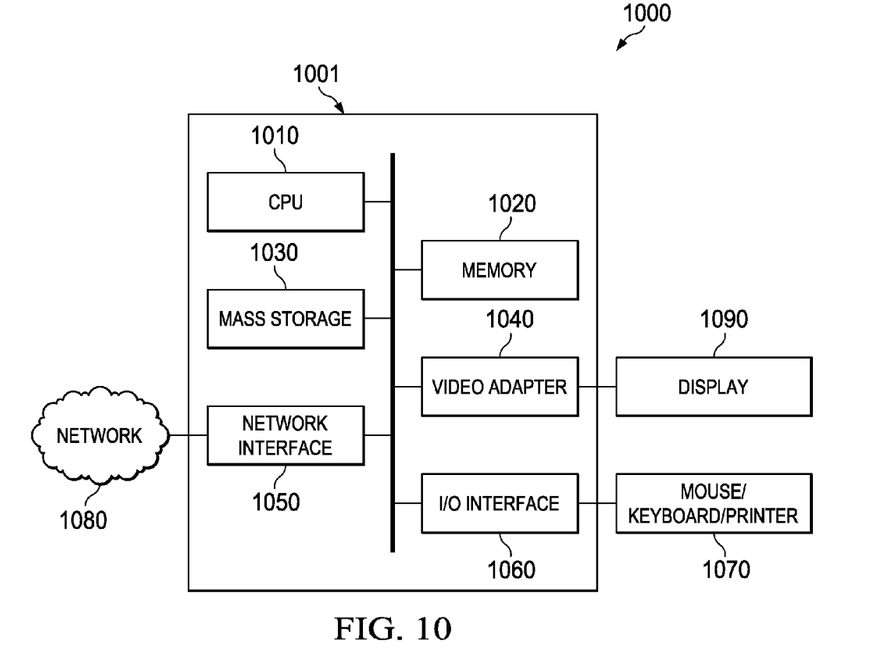
FIG. 10 is a block diagram of a processing system that can be used to implement various embodiments.

FIG. 10 is a block diagram of a processing system 1000 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a speaker, microphone, mouse, touchscreen, keypad, keyboard, printer, display, and the like. The processing unit 1001 may include a central processing unit (CPU) 1010, a memory 1020, a mass storage device 1030, a video adapter 1040, and an I/O interface 1050 connected to a bus. The bus may be one or more of any type of several bus architectures including a memory bus or memory controller, a peripheral bus, a video bus, or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The video adapter 1040 and the I/O interface 1060 provide interfaces to couple external input and output devices to the processing unit. As illustrated, examples of input and output devices include a display 1060 coupled to the video adapter 1040 and any combination of mouse/keyboard/printer 1070 coupled to the I/O interface 1060. Other devices may be coupled to the processing unit 1001, and additional or fewer interface cards may be utilized. For example, a serial interface card (not shown) may be used to provide a serial interface for a printer.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method implemented by a user equipment (UE), the method comprising:
    receiving from a network a first signaling indicating one or more reference signal (RS) indices;
    receiving from the network a second signaling indicating one or more interference measurement (IM) indices;
    receiving from the network a third signaling indicating at least a channel state information (CSI) report configuration associated with a CSI report configuration index;
    generating, for a first subframe that is at least a predefined number of subframes earlier than a reporting subframe, a CSI report in accordance with non-zero power CSI RS (CSI-RS) resource elements (REs) corresponding to a first CSI-RS resource configuration associated with an RS index and zero power CSI-RS REs corresponding to a second CSI-RS resource configuration associated with an IM index, wherein both the RS index and the IM index are associated with the CSI report configuration; and
    sending the CSI report to the network on the reporting subframe.

2. The method of claim 1, wherein the one or more RS indices and the one or more IM indices indicate one or more REs allocated for one or more antenna ports of the UE.

3. The method of claim 1, wherein the third signaling indicates a plurality of CSI report configurations, and wherein each of the CSI report configurations indicates a subset of RS resource configurations and a subset of IM resource configurations.

4. The method of claim 1, wherein REs corresponding to the first CSI-RS resource configuration associated with the RS index are on a second subframe that is no later than the first subframe.

5. The method of claim 4, wherein REs corresponding to the second CSI-RS resource configuration associated with the IM index are on a most recent subframe containing the second CSI-RS resource configuration that is no later than the first subframe.

6. A method implemented by a user equipment (UE), the method comprising:
    receiving from a network a first signaling indicating one or more reference signal (RS) indices, each of the one or more RS indices being associated with a channel state information RS (CSI-RS) configuration;
    receiving from the network a second signaling indicating one or more interference measurement (IM) indices, each of the one or more IM indices being associated with a CSI-RS configuration for interference measurement;
    receiving from the network a third signaling indicating one or more channel state information (CSI) report configurations, wherein each of the one or more CSI report configurations is associated with a CSI report configuration index and indicates both a subset of the one or more RS indices and a subset of the one or more IM indices;
    receiving, from the network, a fourth signaling indicating one or more RS resource configurations for one or more Radio Link Monitoring (RLM) or Radio Resource Management (RRM) measurements;

establishing a RLM or RRM measurement according to a subset of the one or more RS resource configurations; and sending a feedback of the RLM or RRM measurement to the network.

7. A method implemented by a user equipment (UE), the method comprising:

receiving from a network a first signaling indicating one or more reference signal (RS) indices, each of the one or more RS indices being associated with a channel state information RS (CSI-RS) configuration for channel/signal measurement;

receiving from the network a second signaling indicating one or more interference measurement (IM) indices, each of the one or more IM indices being associated with a CSI-RS configuration for interference measurement;

receiving from the network a third signaling indicating one or more channel state information (CSI) report configurations, wherein each of the one or more CSI report configurations is associated with a CSI report configuration index and indicates both a subset of the one or more RS indices and a subset of the one or more IM indices;

performing a RS based measurement in accordance with a reference resource for the RS based measurement indicated in a subframe at least a number of subframes earlier than a network configured reporting subframe, wherein the reference resource for the RS based measurement comprises resource elements (REs) in a subframe;

generating a CSI report in accordance with the CSI report configuration using the RS based measurement; and sending the CSI report to the network at the network configured reporting subframe.

8. A method implemented by a user equipment (UE), the method comprising:

receiving from a network a first signaling indicating one or more reference signal (RS) indices, each of the one or more RS indices being associated with a channel state information RS (CSI-RS) configuration for channel/signal measurement;

receiving from the network a second signaling indicating one or more interference measurement (IM) indices, each of the one or more IM indices being associated with a CSI-RS configuration for interference measurement;

receiving from the network a third signaling indicating one or more channel state information (CSI) report configurations, wherein each of the one or more CSI report configurations is associated with a CSI report configuration index and indicates both a subset of the one or more RS indices and a subset of the one or more IM indices;

establishing an IM based on a reference resource for the IM in a subframe at least a number of subframes earlier than a network configured reporting subframe, wherein the reference resource for the IM comprises resource elements (REs) in a subframe;

generating a CSI report in accordance with the CSI report configuration using an RS based measurement and the IM; and sending the CSI report to the network at the network configured reporting subframe.

9. A user equipment (UE) configured for wireless communications measurements and Channel State Information (CSI) feedback, the UE comprising:

a processor; and a computer readable storage medium storing programming for execution by the processor, the programming including instructions to:

receive from a network a first signaling indicating one or more reference signal (RS) indices;

receive from the network a second signaling indicating one or more interference measurement (IM) indices;

receive from the network a third signaling indicating at least a CSI report configuration associated with a CSI report configuration index;

generate, for a first subframe that is at least a pre-defined number of subframes earlier than a reporting subframe, a CSI report in accordance with non-zero power CSI RS (CSI-RS) resource elements (REs) corresponding to a first CSI-RS resource configuration associated with an RS index and zero power CSI-RS REs corresponding to a second CSI-RS resource configuration associated with an IM index, wherein both the RS index and the IM index are associated with the CSI report configuration; and send the CSI report to the network on the reporting subframe.

10. The UE of claim 9, wherein the programming includes further instructions to:

perform a RS based measurement in accordance with a reference resource for the RS based measurement indicated in a subframe at least a number of subframes earlier than a network configured reporting subframe, wherein the reference resource for the RS based measurement comprises REs in a subframe, wherein the CSI report is generated in accordance with the CSI report configuration using the RS based measurement.

11. The UE of claim 9, wherein the programming includes further instructions to:

establish an IM based on a reference resource for the IM in a subframe at least a number of subframes earlier than a network configured reporting subframe, wherein the reference resource for the IM comprises REs in a subframe, wherein the CSI report is generated in accordance with the CSI report configuration using an RS based measurement and the IM.

12. The UE of claim 9, wherein the one or more RS indices are associated with one or more RS resource configurations for non-zero-power CSI-RS resources for signal channel measurements, and wherein the one or more IM indices are associated with one or more IM resource configurations for zero-power CSI-RS IM resources for interference measurements.

13. The UE of claim 9, wherein the programming includes further instructions to:

receive from the network a fourth signaling indicating one or more RS resource configurations for one or more Radio Link Monitoring (RLM) or Radio Resource Management (RRM) measurements;

establish a RLM or RRM measurement according to a subset of the one or more RS resource configurations; and send a feedback of the RLM or RRM measurement to the network.

14. A method implemented by a network component for configuring a user equipment (UE) for wireless communications measurements and Channel State Information (CSI) feedback, the method comprising:

transmitting to the UE a first signaling indicating one or more reference signal (RS) indices, each of the one or more RS indices being associated with a CSI RS (CSI-RS) configuration for channel/signal measurement;

transmitting to the UE a second signaling indicating one or more interference measurement (IM) indices, each of the one or more IM indices being associated with a CSI-RS configuration for interference measurement;

transmitting to the UE a third signaling indicating one or more CSI report configurations, wherein each of the one or more CSI report configurations is associated with a CSI report configuration index and indicates both a subset of the one or more RS indices and a subset of the one or more IM indices;

transmitting to the UE a fourth signaling that indicates one or more RS resource configurations for one or more Radio Link Monitoring (RLM) or Radio Resource Management (RRM) measurements; and receiving from the UE a feedback of a RLM or RRM measurement established according to a subset of the one or more RS resource configurations, wherein the first signaling, the second signaling, the third signaling, and the fourth signaling are transmitted jointly as a combined signal to the UE.

15. The method of claim 14, further comprising receiving from the UE a CSI report generated at the UE in accordance with at least one of the one or more CSI report configurations.

16. The method of claim 15, wherein the third signaling indicates a bitmap for linking the subset of the one or more RS indices the subset of the one or more IM indices to the CSI report.

17. The method of claim 14, wherein the one or more RS indices are associated with a plurality of RS resource configurations that support joint transmission, and wherein the one or more IM indices are associated with a plurality of IM resource configurations that support joint transmission.

18. A network component for configuring a user equipment (UE) for wireless communications measurements and Channel State Information (CSI) feedback, the network component comprising:
a processor; and
a computer readable storage medium storing programming for execution by the processor, the programming including instructions to:
transmit to the UE a first signaling indicating one or more reference signal (RS) indices, each of the one or more RS indices being associated with a CSI RS (CSI-RS) configuration for channel/signal measurement;

transmit to the UE a second signaling indicating one or more interference measurement (IM) indices, each of the one or more IM indices being associated with a CSI-RS configuration for interference measurement;

transmit to the UE a third signaling indicating one or more CSI report configurations, wherein each of the one or more CSI report configurations is associated with a CSI report configuration index and indicates both a subset of the one or more RS indices and a subset of the one or more IM indices;

transmit to the UE a fourth signaling that indicates one or more RS resource configurations for one or more Radio Link Monitoring (RLM) or Radio Resource Management (RRM) measurements; and receive from the UE a feedback of a RLM or RRM measurement established according to a subset of the one or more RS resource configurations, wherein the first signaling, the second signaling, the third signaling, and the fourth signaling are transmitted jointly as a combined signal to the UE.

19. The network component of claim 18, wherein the programming includes further includes instructions to receive from the UE a CSI report generated at the UE in accordance with at least one of the one or more CSI report configurations.

20. The network component of claim 19, wherein the CSI report is a channel quantity indicator (CQI) report that supports a cooperative multi-point (CoMP) transmission.

21. A method comprising:
sending, by a network device, higher layer signaling to a user equipment (UE) operating in transmission mode 10, wherein the higher layer signaling configures the UE with one or more channel state information (CSI) report configurations per serving cell, wherein each CSI report configuration is associated with a CSI reference signal (CSI-RS) resource and a CSI interference measurement (CSI-IM) resource, and wherein a CSI reported by the UE corresponds to a CSI report configuration configured by the higher layer signalling;

generating a CSI report in accordance with non-zero power CSI-RS resource elements (REs) in a subframe that is at least a pre-defined number of subframes earlier than a reporting subframe associated with a first CSI report configuration in the one or more CSI report configurations; and sending the CSI report to a network on the reporting subframe.

* * * * *